United States Patent
Pandey

(10) Patent No.: US 12,540,171 B2
(45) Date of Patent: Feb. 3, 2026

(54) COMPOSITIONS AND METHODS FOR TREATING OCULAR DISEASE

(71) Applicant: Asclepix Therapeutics, Inc., Baltimore, MD (US)

(72) Inventor: Niranjan B. Pandey, Baltimore, MD (US)

(73) Assignee: Asclepix Therapeutics, Inc., Baltimore, MD (US)

(*) Notice: Subject to any disclaimer, the term of this patent is extended or adjusted under 35 U.S.C. 154(b) by 989 days.

(21) Appl. No.: 17/442,682

(22) PCT Filed: Mar. 26, 2020

(86) PCT No.: PCT/US2020/024972
§ 371 (c)(1),
(2) Date: Sep. 24, 2021

(87) PCT Pub. No.: WO2020/198481
PCT Pub. Date: Oct. 1, 2020

(65) Prior Publication Data
US 2023/0054032 A1    Feb. 23, 2023

Related U.S. Application Data

(60) Provisional application No. 62/824,017, filed on Mar. 26, 2019.

(51) Int. Cl.
| | |
|---|---|
| *A61K 38/10* | (2006.01) |
| *A61K 9/00* | (2006.01) |
| *A61K 38/00* | (2006.01) |
| *A61K 38/16* | (2006.01) |
| *A61K 38/39* | (2006.01) |
| *A61P 9/10* | (2006.01) |
| *A61P 27/02* | (2006.01) |
| *A61P 27/06* | (2006.01) |
| *A61P 43/00* | (2006.01) |
| *C07K 7/08* | (2006.01) |
| *C07K 14/00* | (2006.01) |
| *C07K 14/78* | (2006.01) |

(52) U.S. Cl.
CPC ............ *C07K 14/78* (2013.01); *A61K 9/0019* (2013.01); *A61K 9/0048* (2013.01); *A61P 27/02* (2018.01); *A61K 38/00* (2013.01)

(58) Field of Classification Search
CPC ........ A61K 38/00; A61K 38/10; A61K 38/16; A61K 38/39; A61K 9/0019; A61K 9/0048; A61P 27/02; A61P 27/06; A61P 43/00; A61P 9/10; C07K 7/08; C07K 14/00; C07K 14/78

See application file for complete search history.

(56) References Cited

U.S. PATENT DOCUMENTS

| | | |
|---|---|---|
| 2013/0316950 A1 | 11/2013 | Popel et al. |
| 2014/0045757 A1 | 2/2014 | Popel et al. |
| 2018/0134753 A1 | 5/2018 | Popel et al. |
| 2018/0339024 A1 | 11/2018 | Bressler et al. |

FOREIGN PATENT DOCUMENTS

| | | | |
|---|---|---|---|
| WO | WO-2014197892 A1 * | 12/2014 | ............. A61K 38/10 |
| WO | 2018067646 | 4/2018 | |
| WO | WO 2018/208829 A1 | 11/2018 | |
| WO | WO 2019/028427 A1 | 2/2019 | |

OTHER PUBLICATIONS

Berendsen HJC, "A Glimpse of the Holy Grail?" Science, 1998, 282: 642-643. (Year: 1998).*
Voet D, Voet JG, Biochemistry, Second Edition, John Wiley & Sons, Inc., 1995, pp. 235-241. (Year: 1995).*
Ngo JT, Marks J, Karplus M, "Computational Complexity, Protein Structure Prediction, and the Levinthal Paradox," The Protein Folding Problem and Tertiary Structure Prediction, K. Merc Jr. and S. Le Grand Edition, 1994, pp. 491-495. (Year: 1994).*
Bradley CM, Barrick D, "Limits of Cooperativity in a Structurally Modular Protein: Response of the Notch Ankyrin Domain to Analogous Alanine Substitutions in Each Repeat," J. Mol. Biol., 2002, 324: 373-386. (Year: 2002).*
"Designing Custom Peptides," from SIGMA Genosys, pp. 1-2. Accessed Dec. 16, 2004. (Year: 2004).*
Rudinger J, "Characteristics of the amino acids as components of a peptide hormone sequence," Peptide Hormones, JA Parsons Edition, University Park Press, Jun. 1976, pp. 1-7. (Year: 1976).*
Yampolsky et al., "The Exchangeability of Amino Acids in Proteins," Genetics, 2005, 170: 1459-1472. (Year: 2005).*
Dean McGee Eye Institute, from Intraocular Injections Services in Oklahoma City, pp. 1-7. Accessed Dec. 18, 2024. (Year: 2024).*
P02462 from UniProt, pp. 1-15. Accessed Dec. 18, 2024. (Year: 2024).*
International Search Report and Written Opinion for International Application No. PCT/US2020/024972, dated Jul. 30, 2020, 11 pages.
Mirando et al. 'A collagen IV-derived peptide disrupts a5B 1 integrin and potentiates Ang2/Tie2 signaling', JCI Insight, Jan. 22, 2019 (Jan. 22, 2019), vol. 4, pp. 1-19.

* cited by examiner

Primary Examiner — Julie Ha
(74) Attorney, Agent, or Firm — Morgan, Lewis & Bockius LLP

(57) ABSTRACT

Methods and pharmaceutical compositions for treating ocular disease are disclosed, including ocular disease involving ocular vascular permeability or ocular inflammation. In various aspects and embodiments, the invention comprises administering about 1 µg to about 1 mg of collagen IV-derived biomimetic peptide or salt thereof to a patient by intraocular injection. Injections are provided at a frequency of from about monthly to about once every two years. In various embodiments, the methods and compositions provide for potent action and long duration of action, with infrequent intravitreal injections of a small volume.

6 Claims, 8 Drawing Sheets

Specification includes a Sequence Listing.

55 yr old Human     89 yr old Human

SEQUENCE LISTING

```
<160> NUMBER OF SEQ ID NOS: 36

<210> SEQ ID NO 1
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 1

Leu Arg Arg Phe Ser Thr Ala Pro Phe Ala Phe Ile Asp Ile Asn Asp
1               5                   10                  15

Val Ile Asn Phe
```

-continued

20

<210> SEQ ID NO 2
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (7)..(7)
<223> OTHER INFORMATION: M, A, or G
<220> FEATURE:
<221> NAME/KEY: MISC_FEATURE
<222> LOCATION: (9)..(9)
<223> OTHER INFORMATION: F, A, Y, or G
<220> FEATURE:
<221> NAME/KEY: MISC_FEATURE
<222> LOCATION: (10)..(10)
<223> OTHER INFORMATION: M, A, G, D-Alanine, or norleucine
<220> FEATURE:
<221> NAME/KEY: MISC_FEATURE
<222> LOCATION: (11)..(11)
<223> OTHER INFORMATION: F, A, Y, G, or 4-chlorophenylalanine
<220> FEATURE:
<221> NAME/KEY: MISC_FEATURE
<222> LOCATION: (12)..(12)
<223> OTHER INFORMATION: Aminobutyric acid, G, S, A, V, T, I, L, or
      Allylglycine
<220> FEATURE:
<221> NAME/KEY: MISC_FEATURE
<222> LOCATION: (18)..(18)
<223> OTHER INFORMATION: Aminobutyric acid, G, S, A, V, T, I, L, or
      Allylglycine

<400> SEQUENCE: 2

Leu Arg Arg Phe Ser Thr Xaa Pro Xaa Xaa Xaa Xaa Asn Ile Asn Asn
1               5                   10                  15

Val Xaa Asn Phe
            20

<210> SEQ ID NO 3
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 3

Leu Arg Arg Phe Ser Thr Ala Pro Phe Ala Phe Ile Asn Ile Asn Asn
1               5                   10                  15

Val Ile Asn Phe
            20

<210> SEQ ID NO 4
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (7)..(7)
<223> OTHER INFORMATION: M, A, or G
<220> FEATURE:
<221> NAME/KEY: MISC_FEATURE
<222> LOCATION: (9)..(9)
<223> OTHER INFORMATION: F, A, Y, or G
<220> FEATURE:
<221> NAME/KEY: MISC_FEATURE
<222> LOCATION: (10)..(10)
<223> OTHER INFORMATION: M, A, G, D-Alanine, or norleucine

```
<220> FEATURE:
<221> NAME/KEY: MISC_FEATURE
<222> LOCATION: (11)..(11)
<223> OTHER INFORMATION: F, A, Y, G, or 4-chlorophenylalanine
<220> FEATURE:
<221> NAME/KEY: MISC_FEATURE
<222> LOCATION: (12)..(12)
<223> OTHER INFORMATION: Aminobutyric acid, G, S, A, V, T, I, L, or
      Allylglycine
<220> FEATURE:
<221> NAME/KEY: MISC_FEATURE
<222> LOCATION: (18)..(18)
<223> OTHER INFORMATION: Aminobutyric acid, G, S, A, V, T, I, L, or
      Allylglycine

<400> SEQUENCE: 4

Leu Arg Arg Phe Ser Thr Xaa Pro Xaa Xaa Xaa Xaa Asp Ile Asn Asp
1               5                   10                  15

Val Xaa Asn Phe
            20

<210> SEQ ID NO 5
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 5

Leu Arg Arg Phe Ser Thr Met Pro Phe Met Phe Xaa Asn Ile Asn Asn
1               5                   10                  15

Val Xaa Asn Phe
            20

<210> SEQ ID NO 6
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 6

Leu Arg Arg Phe Ser Thr Met Pro Ala Met Phe Xaa Asn Ile Asn Asn
1               5                   10                  15

Val Xaa Asn Phe
            20

<210> SEQ ID NO 7
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
```

<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 7

Leu Arg Arg Phe Ser Thr Met Pro Phe Ala Phe Xaa Asn Ile Asn Asn
1               5                   10                  15

Val Xaa Asn Phe
        20

<210> SEQ ID NO 8
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 8

Leu Arg Arg Phe Ser Thr Met Pro Phe Met Ala Xaa Asn Ile Asn Asn
1               5                   10                  15

Val Xaa Asn Phe
        20

<210> SEQ ID NO 9
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (10)..(10)
<223> OTHER INFORMATION: norleucine
<220> FEATURE:
<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 9

Leu Arg Arg Phe Ser Thr Met Pro Phe Xaa Phe Xaa Asn Ile Asn Asn
1               5                   10                  15

Val Xaa Asn Phe
        20

<210> SEQ ID NO 10
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (11)..(11)
<223> OTHER INFORMATION: 4-chlorophenylalanine

```
<220> FEATURE:
<221> NAME/KEY: MISC_FEATURE
<222> LOCATION: (12)..(12)
<223> OTHER INFORMATION: 2-Aminobutyric acid
<220> FEATURE:
<221> NAME/KEY: MISC_FEATURE
<222> LOCATION: (18)..(18)
<223> OTHER INFORMATION: 2-Aminobutyric acid

<400> SEQUENCE: 10

Leu Arg Arg Phe Ser Thr Met Pro Phe Met Xaa Xaa Asn Ile Asn Asn
1               5                   10                  15

Val Xaa Asn Phe
        20

<210> SEQ ID NO 11
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 11

Leu Arg Arg Phe Ser Thr Met Pro Phe Met Phe Ser Asn Ile Asn Asn
1               5                   10                  15

Val Ser Asn Phe
        20

<210> SEQ ID NO 12
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 12

Leu Arg Arg Phe Ser Thr Met Pro Phe Met Phe Ala Asn Ile Asn Asn
1               5                   10                  15

Val Ala Asn Phe
        20

<210> SEQ ID NO 13
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 13

Leu Arg Arg Phe Ser Thr Met Pro Phe Met Phe Ile Asn Ile Asn Asn
1               5                   10                  15

Val Ile Asn Phe
        20

<210> SEQ ID NO 14
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 14

Leu Arg Arg Phe Ser Thr Met Pro Phe Met Phe Thr Asn Ile Asn Asn
1               5                   10                  15

Val Thr Asn Phe
```

```
<210> SEQ ID NO 15
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (12)..(12)
<223> OTHER INFORMATION: Allylglycine
<220> FEATURE:
<221> NAME/KEY: MISC_FEATURE
<222> LOCATION: (18)..(18)
<223> OTHER INFORMATION: Allylglycine

<400> SEQUENCE: 15

Leu Arg Arg Phe Ser Thr Met Pro Phe Met Phe Xaa Asn Ile Asn Asn
1               5                   10                  15

Val Xaa Asn Phe
            20

<210> SEQ ID NO 16
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 16

Leu Arg Arg Phe Ser Thr Met Pro Phe Met Phe Val Asn Ile Asn Asn
1               5                   10                  15

Val Val Asn Phe
            20

<210> SEQ ID NO 17
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (10)..(10)
<223> OTHER INFORMATION: D-Alanine

<400> SEQUENCE: 17

Leu Arg Arg Phe Ser Thr Met Pro Phe Xaa Phe Ile Asn Ile Asn Asn
1               5                   10                  15

Val Ile Asn Phe
            20

<210> SEQ ID NO 18
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 18

Leu Arg Arg Phe Ser Thr Met Pro Phe Ala Phe Ile Asn Ile Asn Asn
1               5                   10                  15

Val Ile Asn Phe
            20
```

```
<210> SEQ ID NO 19
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 19

Leu Arg Arg Phe Ser Thr Ala Pro Phe Ala Phe Ile Asn Ile Asn Asn
1               5                   10                  15

Val Ile Asn Phe
            20

<210> SEQ ID NO 20
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (10)..(10)
<223> OTHER INFORMATION: D-Alanine

<400> SEQUENCE: 20

Leu Arg Arg Phe Ser Thr Ala Pro Phe Xaa Phe Ile Asp Ile Asn Asp
1               5                   10                  15

Val Ile Asn Phe
            20

<210> SEQ ID NO 21
<211> LENGTH: 20
<212> TYPE: PRT
<213> ORGANISM: Artificial Sequence
<220> FEATURE:
<223> OTHER INFORMATION: Synthetic Polypeptide

<400> SEQUENCE: 21

Leu Arg Arg Phe Ser Thr Ala Pro Phe Ala Phe Ile Asp Ile Asn Asp
1               5                   10                  15

Val Ile Asn Trp
            20

<210> SEQ ID NO 22
<211> LENGTH: 23
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (1)..(1)
<223> OTHER INFORMATION: D-Leucine
<220> FEATURE:
<221> NAME/KEY: MISC_FEATURE
<222> LOCATION: (4)..(4)
<223> OTHER INFORMATION: D-Leucine

<400> SEQUENCE: 22

Xaa Arg Arg Xaa Arg Arg Phe Ser Thr Ala Pro Phe Ala Phe Ile Asp
1               5                   10                  15

Ile Asn Asp Val Ile Asn Phe
            20

<210> SEQ ID NO 23
<211> LENGTH: 20
<212> TYPE: PRT
```

```
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (20)..(20)
<223> OTHER INFORMATION: D-Phenylalanine

<400> SEQUENCE: 23

Leu Arg Arg Phe Ser Thr Ala Pro Phe Ala Phe Ile Asp Ile Asn Asp
1               5                   10                  15

Val Ile Asn Xaa
            20

<210> SEQ ID NO 24
<211> LENGTH: 20
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (1)..(1)
<223> OTHER INFORMATION: D-Leucine
<220> FEATURE:
<221> NAME/KEY: MISC_FEATURE
<222> LOCATION: (20)..(20)
<223> OTHER INFORMATION: D-Phenylalanine

<400> SEQUENCE: 24

Xaa Arg Arg Phe Ser Thr Ala Pro Phe Ala Phe Ile Asp Ile Asn Asp
1               5                   10                  15

Val Ile Asn Xaa
            20

<210> SEQ ID NO 25
<211> LENGTH: 9
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (2)..(2)
<223> OTHER INFORMATION: 2-Aminobutyric acid
<220> FEATURE:
<221> NAME/KEY: MISC_FEATURE
<222> LOCATION: (8)..(8)
<223> OTHER INFORMATION: 2-Aminobutyric acid

<400> SEQUENCE: 25

Phe Xaa Asn Ile Asn Asn Val Xaa Asn
1               5

<210> SEQ ID NO 26
<211> LENGTH: 9
<212> TYPE: PRT
<213> ORGANISM: Artificial Sequence
<220> FEATURE:
<223> OTHER INFORMATION: Synthetic Polypeptide

<400> SEQUENCE: 26

Phe Thr Asn Ile Asn Asn Val Thr Asn
1               5

<210> SEQ ID NO 27
<211> LENGTH: 10
<212> TYPE: PRT
<213> ORGANISM: Artificial Sequence
```

```
<220> FEATURE:
<223> OTHER INFORMATION: Synthetic Polypeptide

<400> SEQUENCE: 27

Phe Ile Asn Ile Asn Asn Val Ile Asn Phe
1               5                   10

<210> SEQ ID NO 28
<211> LENGTH: 10
<212> TYPE: PRT
<213> ORGANISM: Artificial Sequence
<220> FEATURE:
<223> OTHER INFORMATION: Synthetic Polypeptide

<400> SEQUENCE: 28

Phe Ser Asn Ile Asn Asn Val Ser Asn Phe
1               5                   10

<210> SEQ ID NO 29
<211> LENGTH: 10
<212> TYPE: PRT
<213> ORGANISM: Artificial Sequence
<220> FEATURE:
<223> OTHER INFORMATION: Synthetic Polypeptide

<400> SEQUENCE: 29

Phe Ala Asn Ile Asn Asn Val Ala Asn Phe
1               5                   10

<210> SEQ ID NO 30
<211> LENGTH: 10
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (2)..(2)
<223> OTHER INFORMATION: Allylglycine
<220> FEATURE:
<221> NAME/KEY: MISC_FEATURE
<222> LOCATION: (8)..(8)
<223> OTHER INFORMATION: Allylglycine

<400> SEQUENCE: 30

Phe Xaa Asn Ile Asn Asn Val Xaa Asn Phe
1               5                   10

<210> SEQ ID NO 31
<211> LENGTH: 10
<212> TYPE: PRT
<213> ORGANISM: Artificial Sequence
<220> FEATURE:
<223> OTHER INFORMATION: Synthetic Polypeptide

<400> SEQUENCE: 31

Phe Val Asn Ile Asn Asn Val Val Asn Phe
1               5                   10

<210> SEQ ID NO 32
<211> LENGTH: 10
<212> TYPE: PRT
<213> ORGANISM: Artificial Sequence
<220> FEATURE:
<223> OTHER INFORMATION: Synthetic Polypeptide

<400> SEQUENCE: 32

Phe Ile Asp Ile Asn Asp Val Ile Asn Phe
```

```
                                  -continued
1               5                   10

<210> SEQ ID NO 33
<211> LENGTH: 10
<212> TYPE: PRT
<213> ORGANISM: Artificial Sequence
<220> FEATURE:
<223> OTHER INFORMATION: Synthetic Polypeptide

<400> SEQUENCE: 33

Phe Ile Asp Ile Asn Asp Val Ile Asn Trp
1               5                   10

<210> SEQ ID NO 34
<211> LENGTH: 9
<212> TYPE: PRT
<213> ORGANISM: Artificial Sequence
<220> FEATURE:
<223> OTHER INFORMATION: Synthetic Polypeptide

<400> SEQUENCE: 34

Phe Thr Asp Ile Asn Asp Val Thr Asn
1               5

<210> SEQ ID NO 35
<211> LENGTH: 10
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (2)..(2)
<223> OTHER INFORMATION: 2-Aminobutyric acid
<220> FEATURE:
<221> NAME/KEY: MISC_FEATURE
<222> LOCATION: (8)..(8)
<223> OTHER INFORMATION: 2-Aminobutyric acid

<400> SEQUENCE: 35

Ala Xaa Asn Ile Asn Asn Val Xaa Asn Phe
1               5                   10

<210> SEQ ID NO 36
<211> LENGTH: 10
<212> TYPE: PRT
<213> ORGANISM: Artificial Sequence
<220> FEATURE:
<223> OTHER INFORMATION: Synthetic Polypeptide
<220> FEATURE:
<221> NAME/KEY: MISC_FEATURE
<222> LOCATION: (1)..(1)
<223> OTHER INFORMATION: 4-chlorophenylalanine
<220> FEATURE:
<221> NAME/KEY: MISC_FEATURE
<222> LOCATION: (2)..(2)
<223> OTHER INFORMATION: 2-Aminobutyric acid
<220> FEATURE:
<221> NAME/KEY: MISC_FEATURE
<222> LOCATION: (8)..(8)
<223> OTHER INFORMATION: 2-Aminobutyric acid

<400> SEQUENCE: 36

Xaa Xaa Asn Ile Asn Asn Val Xaa Asn Phe
1               5                   10
```

COMPOSITIONS AND METHODS FOR TREATING OCULAR DISEASE

PRIORITY

This application claims priority to, and the benefit of, U.S. Provisional Application No. 62/824,017, filed Mar. 26, 2019, which is hereby incorporated by reference in its entirety.

SEQUENCE LISTING

The instant application contains a Sequence Listing which has been submitted in ASCII format via EFS-Web and is hereby incorporated by reference in its entirety. The ASCII copy, created on Apr. 11, 2022, is 13,289 bytes in size and is named, "ASX-014_114293-5014_Sequence_Listing_ST25".

BACKGROUND

Diabetic macular edema (DME) and wet age-related macular degeneration (AMD) are the leading causes of blindness among adults. Progression of AMD leads to erosion of central vision, which is necessary for day-to-day activities such as reading, driving and identifying faces. While dry AMD leads to a gradual loss of vision, wet AMD leads to faster vision loss and is the most advanced form of the disease.

The introduction of injectable vascular endothelial growth factor (anti-VEGF) inhibitors (anti-VEGF drugs) has substantially lowered the incidence of AMD-related blindness, and allows many patients to maintain vision. These anti-VEGF drugs include ranibizumab (LUCENTIS) and aflibercept (EYLEA). During treatment, the ophthalmologist places anesthetic and antiseptic drops on the eye, then administers the anti-VEGF drug by injection into the vitreous (e.g., near the retina at the back of the eye). The recommended frequency of these injections varies from every few weeks to every few months. Patients often require multiple doses over the course of a few months, and repeat treatments are needed for continued benefit. The cost per treatment can be very high, around $2000 per injection in the U.S. Further, potential complications of intravitreal injection include infection (such as that caused by *Streptococcus* endophthalmitis), retinal detachment, ocular hypertension, cataracts, inflammation, and others.

Accordingly, potent, safe, and patient-friendly therapies for eye disease, including retinal disease such as wet AMD and diabetic macular edema, are desirable.

SUMMARY OF ASPECTS OF THE INVENTION

In various aspects and embodiments, the invention provides methods and pharmaceutical compositions for treating ocular disease, including retinal diseases involving vascular permeability and/or inflammation. In various aspects and embodiments, the invention comprises administering about 1 μg to about 1 mg of a collagen IV-derived biomimetic peptide or salt thereof to a patient by intraocular injection. Injections are provided at a frequency of from about monthly to no more frequent than about once every two years. As disclosed herein, the peptides form a clear gel upon intraocular injection, and provide a sustained release over an extended period, with a surprisingly small amount of active agent. Accordingly, the peptide can provide for potent action and long duration of action, with infrequent intravitreal injections of a small volume.

An exemplary collagen-IV-derived biomimetic peptide comprises, consists of, or consists essentially of the amino acid sequence LRRFSTAPFAFIDINDVINF (SEQ ID NO:1). The collagen IV-derived biomimetic peptides promote the Tie2 agonist activities of Angiopoietin 2 (Ang2), thereby stabilizing vasculature. The peptides target and disrupt α5β1 and αVβ3 integrins, and inhibit signaling through multiple receptors, including vascular endothelial growth factor receptor (VEGFR), hepatocyte growth factor receptor (HGFR), insulin-like growth factor receptor (IGFR), and epidermal growth factor receptor (EGFR). The peptide of SEQ ID NO:1 is referred to herein as AXT107.

In some embodiments, the peptide or salt thereof is administered to a patient having a condition selected from diabetic macular edema, retinal vein occlusion, AMD (e.g., wet AMD), or background diabetic retinopathy. In some embodiments, the patient has acute or chronic inflammation of the eye. In some embodiments, the patient has uveitis or an autoimmune or inflammatory condition that manifests in the eye.

In various embodiments of the invention, about 1 mg or less of the collagen IV-derived biomimetic peptide, or salt thereof, is administered by intraocular injection. For example, the collagen IV-derived biomimetic peptide, or salt thereof, is administered at a dose of about 800 μg or less, or about 500 μg or less, or about 250 μg or less (e.g., from 50 to 150 μg) per intraocular injection. The small amount of active agent provides a surprisingly long duration of action, which substantially reduces the frequency of required injections. For example, the peptide or salt thereof may be administered by intraocular injection no more frequently than about once every three months, or no more frequently than about once every four months, or no more frequently than about once every six months, or no more frequently than about once every eight months, or no more frequently than about once every year, or no more frequently than about once every 1.5 years, or no more frequently than about once every two years, or no more frequently than about once every three years.

Further, in accordance with the invention, the peptide is delivered without the use of advanced formulation technologies (e.g., particle encapsulation), such as nanoparticle or microparticle encapsulation, or liposome encapsulation. That is, the peptide is delivered without any encapsulation technology (e.g., the peptide is delivered as a "naked peptide" in aqueous solution). The physical properties of the peptide, which are observed to form a clear gel in the vitreous, are sufficient for potent and long duration of action.

In various embodiments, the peptide can be delivered for conditions (including macular edema, wet AMD) that are refractory or only partially-responsive to vascular endothelial growth factor (VEGF) blockade or inhibitor therapy.

In other aspects, the invention provides pharmaceutical compositions suitable for intravitreal injection. The pharmaceutical compositions comprise about 1 μg to about 1 mg of a collagen IV-derived biomimetic peptide or salt thereof (as disclosed herein) as a unit dose in a pre-filled syringe. For example, the unit dose may be about 700 μg or less of the peptide or salt thereof, or about 500 μg or less of the peptide or salt thereof, or about 250 μg or less of the peptide or salt thereof, or about 100 μg or less of the peptide or salt thereof. An exemplary composition comprises a dose of from 50 to 150 μg of peptide (e.g., about 100 μg).

Other aspects and embodiments of the invention will be apparent from the following detailed description.

DETAILED DESCRIPTION OF THE INVENTION

Figure 1A:
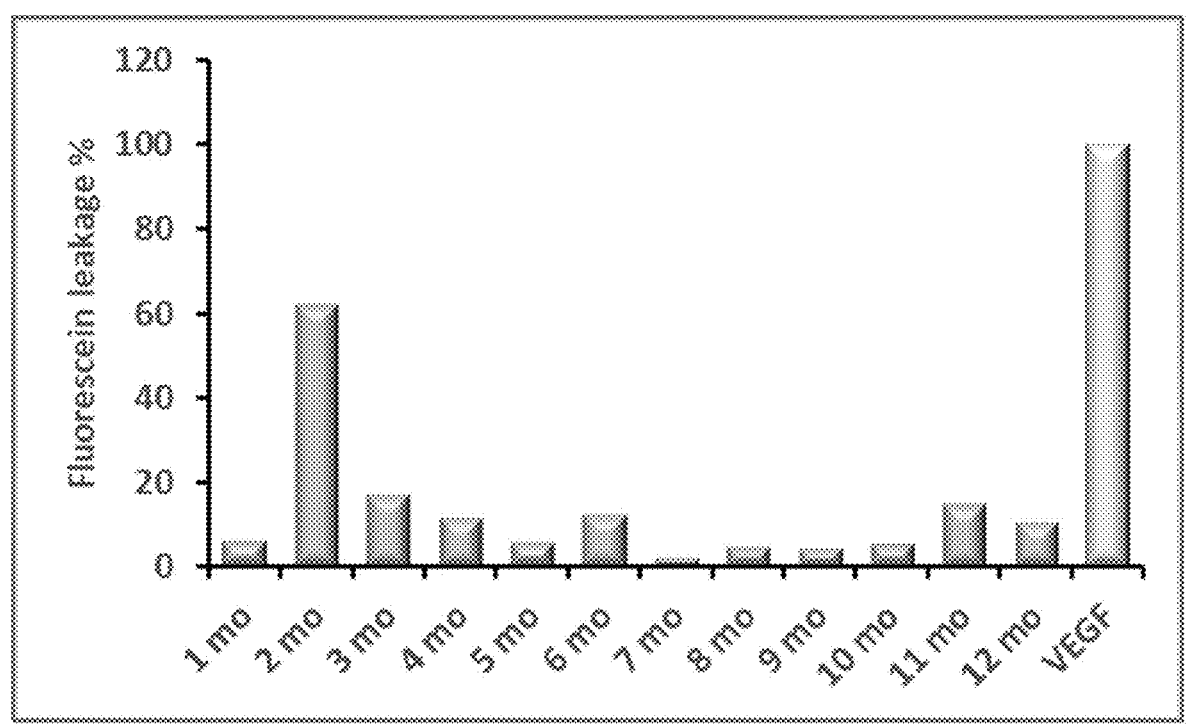
FIG. 1A and FIG. 1B are graphs showing AXT107 inhibition of VEGF-induced vascular leakage by dosing of 100 µg of AXT107 (FIG. 1A) and 500 µg of AXT107 (FIG. 1B) over 12 Months in Dutch-Belted Rabbits. The "VEGF" bar indicates the no AXT107 control and is used to indicate the leakage that occurs in the absence of treatment with AXT107.

In various aspects and embodiments, the invention provides methods and pharmaceutical compositions for treating ocular disease, including retinal diseases involving vascular permeability and/or inflammation. In various aspects and embodiments, the invention comprises administering about 1 µg to about 1 mg of a collagen IV-derived biomimetic peptide or salt thereof to a patient by intraocular injection. Injections are provided at a frequency of from about monthly to no more than about once every two years. As disclosed herein, the peptides form a gel upon intraocular injection, and provide a sustained release over an extended period, with a surprisingly small amount of active agent. Accordingly, the peptide can provide for potent action and long duration of action, with infrequent intravitreal injections of a small volume.

In accordance with aspects of the invention, the active agent is a collagen IV-derived biomimetic peptide that promotes the Tie2 agonist activities of Angiopoietin 2 (Ang2), thereby stabilizing vasculature and providing anti-inflammatory action. See WO 2018/067646, which is hereby incorporated by reference in its entirety.

The collagen IV-derived biomimetic peptides are derived from the α5 fibril of type IV collagen. Exemplary peptides comprise, consist of, or consist essentially of the amino acid sequence LRRFSTAPFAFIDINDVINF (SEQ ID NO:1), or derivatives thereof. The peptides target and disrupt α5β1 and αVβ3 integrins, and inhibit signaling through multiple receptors, including vascular endothelial growth factor receptor (VEGFR), hepatocyte growth factor receptor (HGFR), insulin-like growth factor receptor (IGFR), and epidermal growth factor receptor (EGFR). The peptide of SEQ ID NO:1 is referred to herein as AXT107.

Collagen IV-derived biomimetic peptides further include those described in U.S. Pat. Nos. 9,056,923 and 9,802,984, which are hereby incorporated by reference in their entireties. For example, peptides in accordance with the following disclosure include peptides comprising the amino acid sequence LRRFSTXPXXXXNINNVXNF (SEQ ID NO:2), where X is a standard amino acid or non-genetically encoded amino acid. In some embodiments, X at position 7 is M, A, or G; X at position 9 is F, A, Y, or G; X at position 10 is M, A, G, D-Alanine (dA), or norleucine (Nle); X at position 11 is F, A, Y, G, or 4-chlorophenylalanine (4-Cl-Phe); X at position 12 and position 18 are independently selected from 2-Aminobutyric acid (Abu), G, S, A, V, T, I, L, or Allylglycine (AllylGly). In various embodiments, the peptide contains about 30 amino acids or less, or about 25 amino acids of less, or about 24 amino acids, or about 23 amino acids, or about 22 amino acids, or about 21 amino acids, or about 20 amino acids. In still other embodiments, one, two, three, four, or five amino acids of SEQ ID NO:2 are deleted. In some embodiments, the peptide comprises or consists of the amino acid sequence LRRFSTAP-FAFININNVINF (SEQ ID NO:3).

In some embodiments, the peptide comprises the amino acid sequence LRRFSTAPFAFIDINDVINF (SEQ ID NO:1), or derivative thereof. Derivatives of the peptide of SEQ ID NO:1 include peptides having from 1 to 5 amino acid substitutions, insertions, or deletions (e.g., 1, 2, 3, 4, or 5 amino acid substitutions, insertions, or deletions collectively) with respect to SEQ ID NO:1, although in some embodiments the Asp at positions 13 and 16 are maintained. In some embodiments, the sequence DINDV is maintained in the derivative. The peptide may have the amino acid sequence of LRRFSTXPXXXXDINDVXNF, where X is a standard amino acid or non-genetically encoded amino acid (SEQ ID NO:4). In some embodiments, X at position 7 is M, A, or G; X at position 9 is F, A, Y, or G; X at position 10 is M, A, G, D-Alanine (dA), or norleucine (Nle); X at position 11 is F, A, Y, G, or 4-chlorophenylalanine (4-ClPhe); X at position 12 and position 18 are independently selected from 2-Aminobutyric acid (Abu), G, S, A, V, T, I, L, or Allylglycine (AllylGly). In various embodiments, the peptide contains about 30 amino acids or less, or about 25 amino acids of less, or about 24 amino acids, or about 23 amino acids, or about 22 amino acids, or about 21 amino acids, or about 20 amino acids. In still other embodiments, one, two, three, four, or five amino acids of SEQ ID NO:4 or SEQ ID NO:1 are deleted.

In some embodiments, amino acid substitutions are made at any position of a peptide of SEQ ID NO:1 or 3, which can be independently selected from conservative or non-conservative substitutions. In these or other embodiments, the peptide includes from 1 to 10 amino acids added to one or both termini (collectively). The N- and/or C-termini may optionally be occupied by another chemical group (other than amine or carboxy, e.g., amide or thiol).

Conservative substitutions may be made, for instance, on the basis of similarity in polarity, charge, size, solubility, hydrophobicity, hydrophilicity, and/or the amphipathic nature of the amino acid residues involved. The 20 genetically encoded amino acids can be grouped into the following six standard amino acid groups:

(1) hydrophobic: Met, Ala, Val, Leu, Ile;
(2) neutral hydrophilic: Cys, Ser, Thr; Asn, Gln;

(3) acidic: Asp, Glu;
(4) basic: His, Lys, Arg;
(5) residues that influence chain orientation: Gly, Pro; and
(6) aromatic: Trp, Tyr, Phe.

As used herein, "conservative substitutions" are defined as exchanges of an amino acid by another amino acid listed within the same group of the six standard amino acid groups shown above. For example, the exchange of Asp by Glu retains one negative charge in the so modified polypeptide. In addition, glycine and proline may be substituted for one another based on their ability to disrupt α-helices. Some preferred conservative substitutions within the above six groups are exchanges within the following sub-groups: (i) Ala, Val, Leu and Ile; (ii) Ser and Thr; (iii) Asn and Gln; (iv) Lys and Arg; and (v) Tyr and Phe.

As used herein, "non-conservative substitutions" are defined as exchanges of an amino acid by another amino acid listed in a different group of the six standard amino acid groups (1) to (6) shown above.

In various embodiments, the biomimetic peptide or peptide agent is a peptide of from about 8 to about 30 amino acids, or from about 10 to about 20 amino acids, and has at least 4, at least 5, or at least 6 contiguous amino acids of SEQ ID NO: 1 or 3. In some embodiments, the peptide contains at least one, at least two, or at least three d-amino acids. In some embodiments, the peptide contains from one to about five (e.g., 1, 2, or 3) non-genetically encoded amino acids, which are optionally selected from 2-Aminobutyric acid (Abu), norleucine (Nle), 4-chlorophenylalanine (4-Cl-Phe), and Allylglycine (AllylGly).

Exemplary biomimetic peptides in accordance with the disclosure include:

```
                                        (SEQ ID NO:5)
LRRFSTMPFMF(Abu)NINNV(Abu)NF, (SEQ ID NO:6)
LRRFSTMPAMF(AbU)NINNV(AbU)NF, (SEQ ID NO:7)
LRRFSTMPFAF(AbU)NINNV(AbU)NF, (SEQ ID NO:8)
LRRFSTMPFMA(Abu)NINNV(Abu)NF, (SEQ ID NO:9)
LRRFSTMPF(Nle)F(Abu)NINNV(Abu)NF, (SEQ ID NO:10)
LRRFSTMPFM(4-ClPhe)(Abu)NINNV(Abu)NF, (SEQ ID NO:11)
LRRFSTMPFMFSNINNVSNF, (SEQ ID NO:12)
LRRFSTMPFMFANINNVANF, (SEQ ID NO:13)
LRRFSTMPFMFININNVINF, (SEQ ID NO:14)
LRRFSTMPFMFTNINNVTNF, (SEQ ID NO:15)
LRRFSTMPFMF(AllyGly)NINNV(AllyGly)NF, (SEQ ID NO:16)
LRRFSTMPFMFVNINNVVNF, (SEQ ID NO:17)
LRRFSTMPFdAFININNVINF, (SEQ ID NO:18)
LRRFSTMPFAFININNVINF, (SEQ ID NO:19)
LRRFSTAPFAFININNVINF, (SEQ ID NO:20)
LRRFSTAPFdAFIDINDVINF, (SEQ ID NO:21)
LRRFSTAPFAFIDINDVINW, (SEQ ID NO:22)
dLRRdLRRFSTAPFAFIDINDVINF, (SEQ ID NO:23)
LRRFSTAPFAFIDINDVINdF, (SEQ ID NO:24)
dLRRFSTAPFAFIDINDVINdF.

(SEQ ID NO:25)
F(Abu)NINNV(Abu)N, (SEQ ID NO:26)
FTNINNVTN, (SEQ ID NO:27)
FININNVINF, (SEQ ID NO:28)
FSNINNVSNF, (SEQ ID NO:29)
FANINNVANF, (SEQ ID NO:30)
F(AllyGly)NINNV(AllyGly)NF, (SEQ ID NO:31)
FVNINNVVNF, (SEQ ID NO:32)
FIDINDVINF, (SEQ ID NO:33)
FIDINDVINW, (SEQ ID NO:34)
FTDINDVTN, (SEQ ID NO:35)
A(Abu)NINNV(Abu)NF, or (SEQ ID NO:36)
(4-ClPhe)(Abu)NINNV(Abu)NF.
```

In various embodiments, the biomimetic peptide forms a gel in human vitreous.

In some embodiments, the peptide or salt thereof is administered to a patient having a condition selected from diabetic macular edema, retinal vein occlusion, AMD (e.g., wet AMD), or background diabetic retinopathy. In some embodiments, the patient has acute or chronic inflammation of the eye. In some embodiments, the patient has uveitis or an autoimmune or inflammatory condition that manifests in the eye.

In some embodiments, the patient has macular edema. Macular edema occurs when fluid and protein deposits collect on or under the macula of the eye (a yellow central area of the retina) and causes it to thicken and swell. The causes of macular edema include chronic or uncontrolled diabetes type 2 (e.g., diabetic retinopathy), in which peripheral blood vessels including those of the retina leak fluid into the retina. Other causes and/or associated disorders include age-related macular degeneration (AMD), chronic uveitis, atherosclerosis, high blood pressure and glaucoma. In some embodiments, the patient has or is at risk of retinal vein occlusion, which can lead to severe damage to the retina and blindness, due to ischemia and edema.

In some embodiments, the patient has AMD, which is optionally wet AMD or in some embodiments dry AMD.

The present invention in various embodiments provides for treatment of retinal disease with intravitreal injections of a collagen IV-derived biomimetic peptide, which only requires a small amount of active agent to be administered with infrequent injections. Generally, an intravitreal injection is an injection into the eye, and in particular the vitreous which is a jelly-like fluid that fills the eye. During the procedure, for example as is used conventionally for administering anti-VEGF drugs, the health care provider injects medicine into the vitreous, near the retina at the back of the eye. The procedure often takes about 15 to 30 minutes. For example, the procedure generally involves placing drops in the eyes to dilate the pupils, numbing drops are placed in the eye, and drug is injected into the eye with a small needle. Antibiotic drops may also be used to prevent infection. While the procedure is routine, it does not come without risks and potential complications. These include endophthalmitis, intraocular inflammation, retinal detachment, intraocular pressure elevation, ocular hemorrhage, in addition to systemic side effects. See, Falavarjani K G and Nguyen Q D, Adverse events and complications associated with intravitreal injection of anti-VEGF agents: a review of literature, *Eye* 2013 July; 27(7): 787-794. Further, the procedure for administering conventional anti-VEGF drugs is costly and not convenient since frequent injections are generally required.

In various embodiments of the invention, about 1 mg or less of the collagen IV-derived biomimetic peptide, or salt thereof, is administered by intraocular injection. In various embodiments, the unit dose of peptide is administered at the bottom of the eye, such as between 5:00 and 7:00, so that gel forms at the bottom. For example, the collagen IV-derived biomimetic peptide, or salt thereof, is administered at a dose of from about 25 µg to about 1000 µg. For example, about 800 µg or less, or about 700 µg or less, or about 500 µg or less, or about 250 µg or less, or about 100 µg or less of the peptide or salt thereof is administered per intraocular injection. In such embodiments, at least about 25 µg or at least about 50 µg is administered per intraocular injection. In some embodiments, the unit dose is greater than 1 mg, such as from 1 mg to about 2 mg. The small amount of active agent provides a surprisingly long duration of action, which substantially reduces the frequency of required injections. For example, the peptide or salt thereof may be administered by intraocular injection no more frequently than about once every three months, or no more frequently than about once every four months, or no more frequently than about once every six months, or no more frequently than about once every eight months, or no more frequently than about once every year, or no more frequently than about once every 1.5 years, or no more frequently than about once every two years, or no more frequently than about once every three years.

Further, in accordance with the invention, the peptide is delivered without the use of advanced formulation technologies (e.g., particle encapsulation), such as nanoparticle or microparticle encapsulation, or liposome encapsulation. That is, the peptide is delivered without any encapsulation technology (e.g., the peptide is delivered as a "naked peptide" in aqueous solution). The physical properties of the peptide, which are observed to form a gel in the vitreous, are sufficient for potent and long duration of action.

Unless specifically stated or obvious from context, as used herein, the term "about" includes values within plus or minus 10% of a stated value.

In various embodiments, about 10 µg to about 50 µg of the collagen IV-derived biomimetic peptide, or salt thereof, is administered per intraocular injection, and at a frequency of about once per month or about once every other month. For example, about 25 µg of the peptide or salt thereof may be administered by intraocular injection about monthly. Alternatively, about 50 µg to about 150 µg per intraocular injection is administered at a frequency of no more than about once every third month, or no more frequently than about once every fourth month, or no more frequently than about once every six months. For example, the peptide or salt thereof may be administered at about 50 µg and at a frequency of about once every three or four months. In some embodiments, the peptide or salt thereof is administered at about 100 µg to about 150 µg per injection, and at a frequency of about once every five to seven months, and optionally about once every six months. In some embodiments, the dose of 100 to 150 µg is administered about once every eight months or about once every nine months.

In other embodiments, the amount of active agent delivered per injection is increased, providing unexpected durations of action. For example, the collagen IV-derived biomimetic peptide or salt thereof may be administered at about 150 µg to about 250 µg per intraocular injection, and at a frequency of no more than about once every six months. For example, in these embodiments, the peptide or salt thereof may be administered no more frequently than about once every eight months. In some embodiments, the peptide or salt thereof is administered no more frequently than about once every ten months or about once every twelve months. In some embodiments, the peptide or salt thereof is administered at about 200 µg and at a frequency of about once every six to eight months. In some embodiments, the peptide or salt thereof is administered at about 250 µg and at a frequency of about once every six to twelve months.

In still other embodiments, the peptide or salt thereof is administered at from about 250 µg to about 1 mg per intraocular injection, and at a frequency of no more than about once every six months. In these embodiments, the peptide or salt thereof is administered at about 300 µg to about 700 µg per injection, or is administered at about 400 µg to about 700 µg per injection, or is administered at about 500 µg to about 700 µg per injection, or is administered at about 600 µg to about 700 µg per injection. In some embodiments, the peptide or salt thereof is administered at a frequency of about once every six to twelve months. For example, the peptide or salt thereof is administered about once every seven months, about once every eight months, about once every nine months, about once every ten months, about once every eleven months, or about once every twelve months, or about once every 18 months.

In still further embodiments, the peptide or salt thereof is administered at from about 700 µg to about 1 mg per intraocular injection, and at a frequency of no more than once every twelve months or no more than once every 15 months. In some embodiments, the peptide or salt thereof is administered at about 800 µg to about 1 mg per injection, or is administered at about 900 µg to about 1 mg per injection, or is administered at a frequency of once every twelve to eighteen months. In some embodiments, the peptide or salt thereof is administered about once every two years or about once every three years.

In some embodiments, the peptide dosed as described above, is the peptide consisting of SEQ ID NO:1 (AXT107).

In various embodiments, the patient will receive a plurality of doses, and in some embodiments, therapy can be continuous at the recommended frequency of injections for disease control or management. In some embodiments, therapy need not be continuous, where symptoms or disease has been substantially alleviated. In various embodiments, the patient receives at least two injections, or at least four injections, or at least six injections, or at least eight injections, or at least ten injections. In some embodiments, injections are provided in a regimen of from four to ten injections.

The collagen IV-derived peptide promotes the Tie2 agonist activities of Angiopoietin 2 (Ang2), thereby stabilizing vasculature. The peptides target and disrupt α5β1 and αVβ3 integrins, and inhibit signaling through multiple receptors, including vascular endothelial growth factor receptor (VEGFR), hepatocyte growth factor receptor (HGFR), insulin-like growth factor receptor (IGFR), and epidermal growth factor receptor (EGFR). Accordingly, the peptides disclosed herein provide a potent alternative to VEGF blockade or inhibitor therapy, or potent combination therapy.

In various embodiments, the peptide can be delivered for conditions (including macular edema, wet AMD) that are refractory or only partially-responsive to vascular endothelial growth factor (VEGF) blockade or inhibitor therapy. Pharmaceutical agents that block VEGF include aflibercept, bevacizumab, ranibizumab, and ramucirumab, and similar agents, which are administered to slow or block angiogenesis. Other agents that target VEGF-mediated biological activity include kinase inhibitors such as pazopanib, sorafenib, sunitinib, axitinib, ponatinib, lenvatinib, vandetanib, regorafenib, and cabozantinib.

Aflibercept is a biopharmaceutical drug for the treatment of wet macular degeneration (EYLEA). Aflibercept is an inhibitor of VEGF, and is a recombinant fusion protein consisting of vascular endothelial growth factor (VEGF)-binding portions from the extracellular domains of human VEGF receptors 1 and 2, that are fused to the Fc portion of the human IgG1 immunoglobulin. Aflibercept binds to VEGFs and acts like a "VEGF trap", inhibiting the activity of the vascular endothelial growth factor subtypes VEGF-A and VEGF-B, as well as to placental growth factor (PGF).

Bevacizumab (AVASTIN) is an angiogenesis inhibitor, a drug that slows the growth of new blood vessels. Bevacizumab is a recombinant humanized monoclonal antibody that blocks angiogenesis by inhibiting VEGF-A. Bevacizumab is administered for treating certain metastatic cancers, including colon cancer, lung cancers (e.g., NSCLC), renal cancers, ovarian cancers, breast cancer, and glioblastoma. Bevacizumab can also be used for treatment of eye diseases, including AMD and diabetic retinopathy.

Ranibizumab (LUCENTIS) is a monoclonal antibody fragment (Fab), and is administered for treatment of wet AMD. The drug is injected intravitreally (into the vitreous humour of the eye) about once a month. Ranibizumab is a monoclonal antibody that inhibits angiogenesis by inhibiting VEGF A, similar to Bevacizumab.

The biomimetic peptide may be administered after unsuccessful VEGF blockade therapy, that is, where reductions in angiogenesis, lymphangiogenesis, and/or edema were not observed. In some embodiments, the peptide is administered as an alternative to VEGF blockade therapy. In still further embodiments, the peptide is administered in combination with VEGF blockade therapy, either simultaneously with, before, or after a VEGF blockade regimen. By activating Tie2 signaling, the biomimetic peptides or peptide agents provide therapeutic benefits that may not be observed with VEGF blockage therapy, or VEGF blockade therapy alone.

Therefore, in some embodiments, the peptide or salt thereof is administered after unsuccessful VEGF blockade or inhibitor therapy. In some embodiments, the patient has a condition that is refractory or only partially-responsive to VEGF blockade or inhibitor therapy.

In other aspects, the invention provides pharmaceutical compositions suitable for intravitreal injection. The pharmaceutical compositions comprise about 1 μg to about 1 mg or about 25 μg to about 800 μg of a collagen IV-derived biomimetic peptide or salt thereof (as disclosed herein) as a unit dose in a pre-filled syringe. For example, the unit dose may be about 700 μg or less of the peptide or salt thereof, or about 500 μg or less of the peptide or salt thereof, or about 250 μg or less of the peptide or salt thereof, or about 100 μg or less of the peptide or salt thereof. Exemplary unit doses include about 100 μg, about 250 μg, about 500 μg, and about 750 μg.

In some embodiments, the composition has a unit dose of from about 10 μg to about 50 μg of the peptide or salt thereof. In other embodiments, the composition has a unit dose of from about 50 μg to about 150 μg (e.g., about 100 μg) of the peptide or salt thereof. In some embodiments, the composition has a unit dose of from about 150 μg to about 250 of the peptide or salt thereof. In some embodiments, the composition has a unit dose of from about 250 μg to about 700 μg, or about 300 μg to about 700 μg, or about 400 μg to about 700 μg, or about 500 μg to about 700 μg, or about 600 μg to about 700 μg of the peptide or salt thereof.

In still other embodiments, the pharmaceutical composition has a unit dose of from about 700 μg to about 1 mg, or from about 800 μg to about 1 mg, of the peptide or salt thereof. In some embodiments, the unit dose is about 1 mg. In some embodiments, the unit dose is greater than 1 mg, such as from about 1 mg to about 2 mg.

The unit dose volume (in accordance with the compositions and methods described herein) may be in the range of about 1 μl to about 1 mL, or from about 10 μL to about 0.5 mL, or from about 10 μL to about 250 μL, or from about 10 μL to about 50 μL. In some embodiments, the pharmaceutical composition comprises a unit volume of from about 25 μL to about 0.5 mL, or a unit volume of from about 25 μL to about 200 μL, or a unit volume of from about 25 μL to about 100 μL. In some embodiments, the unit volume is less than about 100 μL, or less than about 50 μL, or less than about 25 μL. In various embodiments, the volume is about 50 μL.

The biomimetic peptides or peptide agents can be chemically synthesized and purified using well-known techniques, such as solid-phase synthesis. See U.S. Pat. No. 9,051,349, which is hereby incorporated by reference in its entirety.

Peptides may be provided in the form of a pharmaceutically acceptable salt in some embodiments. Pharmaceutically acceptable peptide salts are generally well known to those of ordinary skill in the art.

The biomimetic peptide or peptide agent may be formulated for intraocular injection (i.e., intravitreal injection) using a variety of pharmaceutically acceptable carriers, including, but not limited to, water, saline, dextrose solutions, etc. The biomimetic peptides may be formulated and diluted in aqueous solutions, such as in physiologically compatible buffers.

In certain aspects, the invention provides a method for preventing or treating an eye disease or condition involving Tie-2-related vascular permeability in a patient. The method comprises administering the pharmaceutical composition described herein to the patient, at a dosing schedule (i.e., frequency) described herein. In accordance with embodiments of the invention, with only small amounts of active agent and infrequent injection of unit doses, potent and long acting restoration of Tie2 activation can be achieved. In various embodiments, the method provides therapeutic benefit in conditions associated with edema or vascular permeability, including macular edema, diabetic macular edema (DME), and other conditions, including conditions characterized by acute or chronic ocular inflammation. Tie2-related conditions include diabetic macular edema, retinal vein occlusion, wet AMD, background diabetic retinopathy.

As used herein, the term "about" includes ±10% of the associated numerical value.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The invention will further be described in accordance with the following non-limiting examples.

EXAMPLES

The following examples demonstrate that AXT107 and its derivative peptides are potent, safe, and have a surprisingly long duration of action with infrequent intravitreal injections of a small volume. The invention thereby provides patient-friendly therapies for eye disease, including retinal disease such as wet AMD and diabetic macular edema.

Figure 1B:
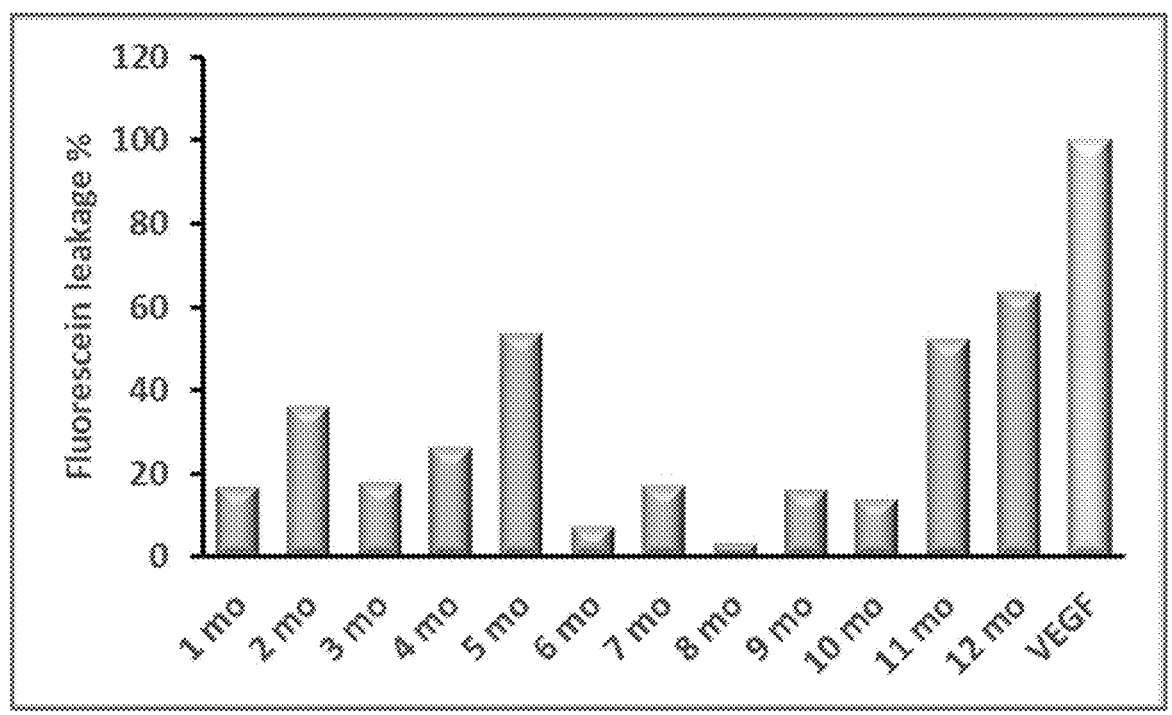

In these experiments, Dutch Belted rabbits were anesthetized with an intramuscular injection of ketamine (25 mg/kg) and xylazine (2.5 mg/kg), and the pupils were dilated with 2.5% phenylephrine. The conjunctiva was cleaned with 5% povidone-iodine and an intravitreous injection of 100 μg or 500 μg of AXT107 was given in one eye. Twenty-three days after injection of AXT107, 10 μg of VEGF was injected into the vitreous and 7 days later, 30 days after the initial AXT107 injection, vitreous fluorophotometry (VFP) was performed with a Fluorotron Master™ ocular fluorophotometer fitted with an animal adapter (OcuMetrics, Mountain View, CA). For VFP, 15 mg of sodium fluorescein (AK-Fluor 10%, Akorn, Lake Forest, IL) was injected into an ear vein, and after one-hour fluorescence was measured along the visual axis from the retina to the cornea. The area under the fluorescein concentration curve between 5 and 7 mm was calculated in front of the retina to determine the extent of leakage. This protocol of VEGF injection and VFP measurement was done on day 23 and day 30 of every subsequent month for 12 months. The leakage each month in eyes administered AXT107 was normalized to animals injected with VEGF only, at the same time point. See FIGS. 1A and 1B.

The results of these experiments show that AXT107 potently inhibits VEGF-induced vascular leakage in the rabbit eye, which is a better surrogate of human eye than mouse eye because of its size. In addition, AXT107 potently inhibits VEGF-induced vascular leakage for at least 12 months in the rabbit eye.

Figure 2:
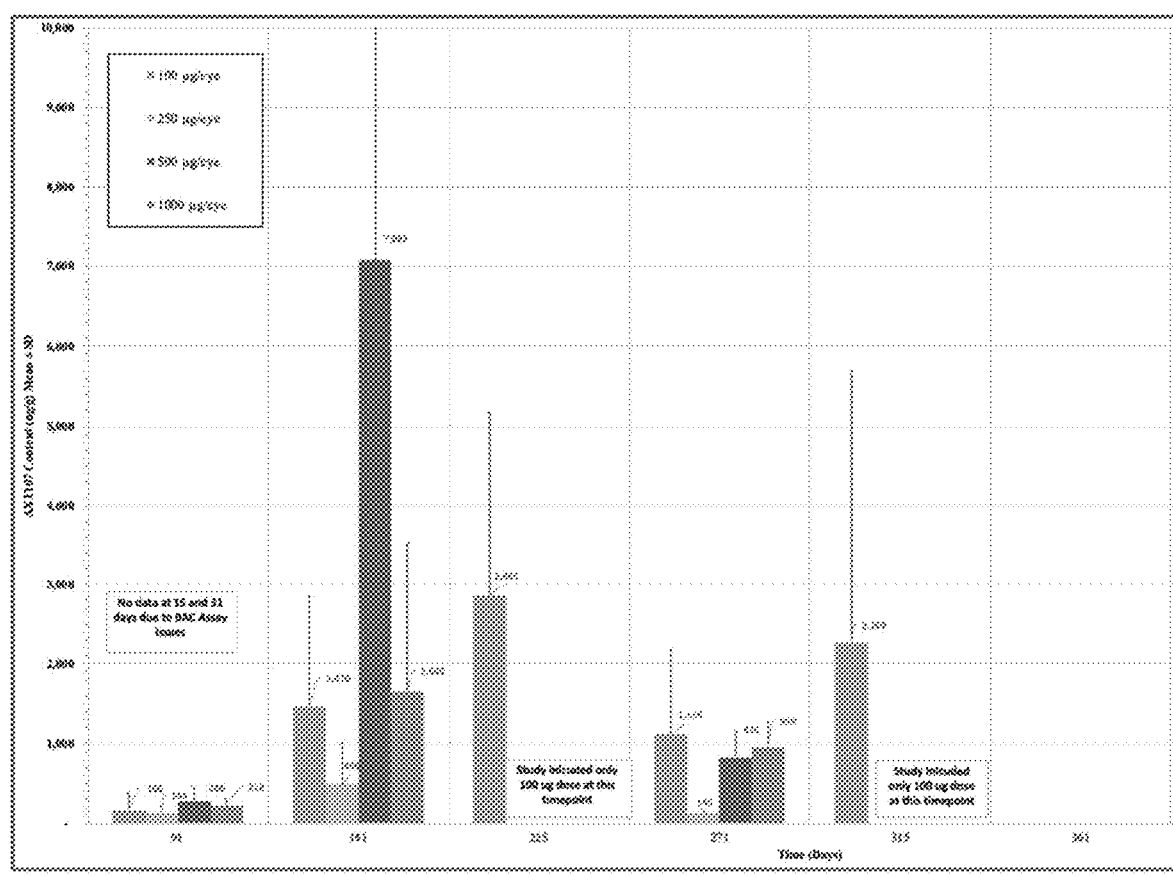
FIG. 2 are graphs showing the amounts of AXT107 expressed as nanograms per gram (ng/g) that are present in the retina of Dutch-Belted Rabbits at various time points after intravitreal administration. AXT107 is found at significant levels in the retina 225, 271, and 315 days after a single injection.

In FIG. 2, AXT107 was injected into the vitreous of Dutch-Belted rabbits. The rabbits were then sacrificed at various time points, and the various ocular tissues were separated. The drug levels in the retina were measured by Liquid chromatography-mass spectrometry (LC/MS/MS). The drug levels were plotted as ng/g. The Kd for binding of AXT107 to its integrin targets is 1-2 nM. AXT107 is present at 100 ng/g or greater resulting in concentrations significantly greater than the Kd in the retina 225, 271, and 315 day time points.

Figure 3:
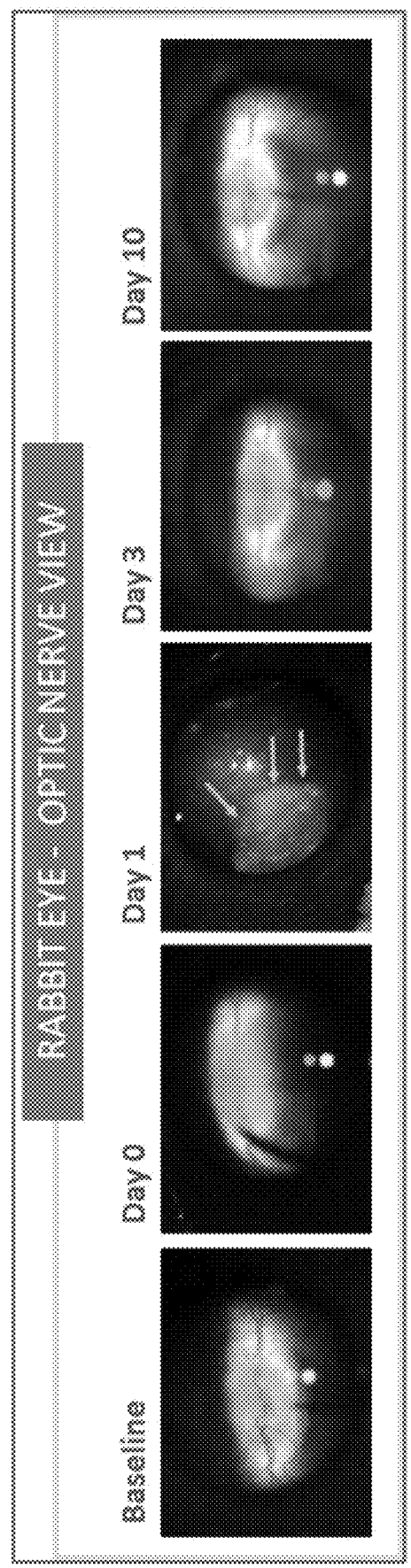
FIG. 3 is an image showing that AXT107 forms a gel upon injection in the rabbit eye. The gel remains below the visual axis, and does not block either the visual axis or the optic nerve.

In FIG. 3, AXT107 was injected into the vitreous of Dutch-Belted rabbits. One day later a gel was visible at the site of injection. The gel is marked by arrows in FIG. 3. The retina with the optic nerve is visible in the back of the eye. The gel is compact and does not block the visual axis.

Figure 4:
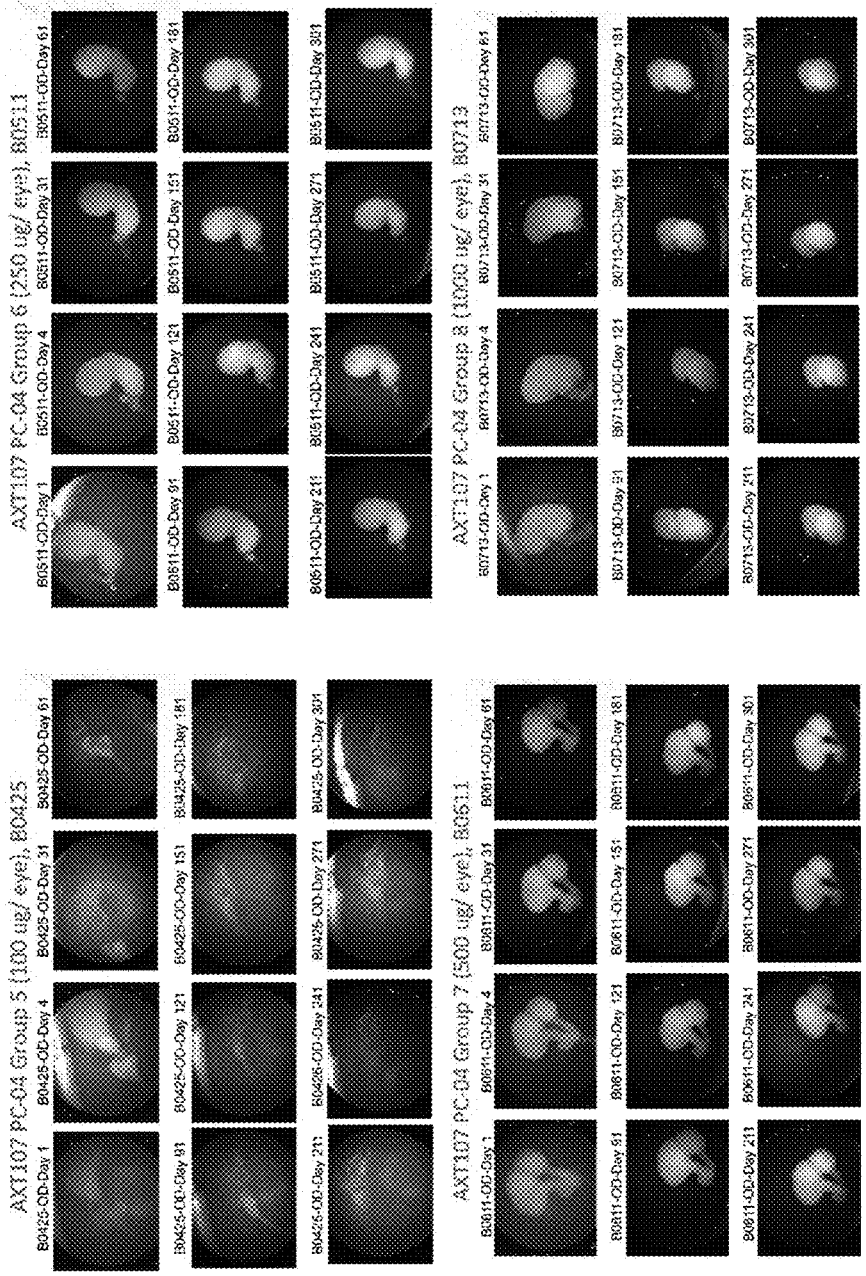
FIG. 4 shows images of the gel over 301 days for AXT107 doses of 100 µg, 250 µg, 500 µg, and 1000 µg after a single injection.
Figure 5:
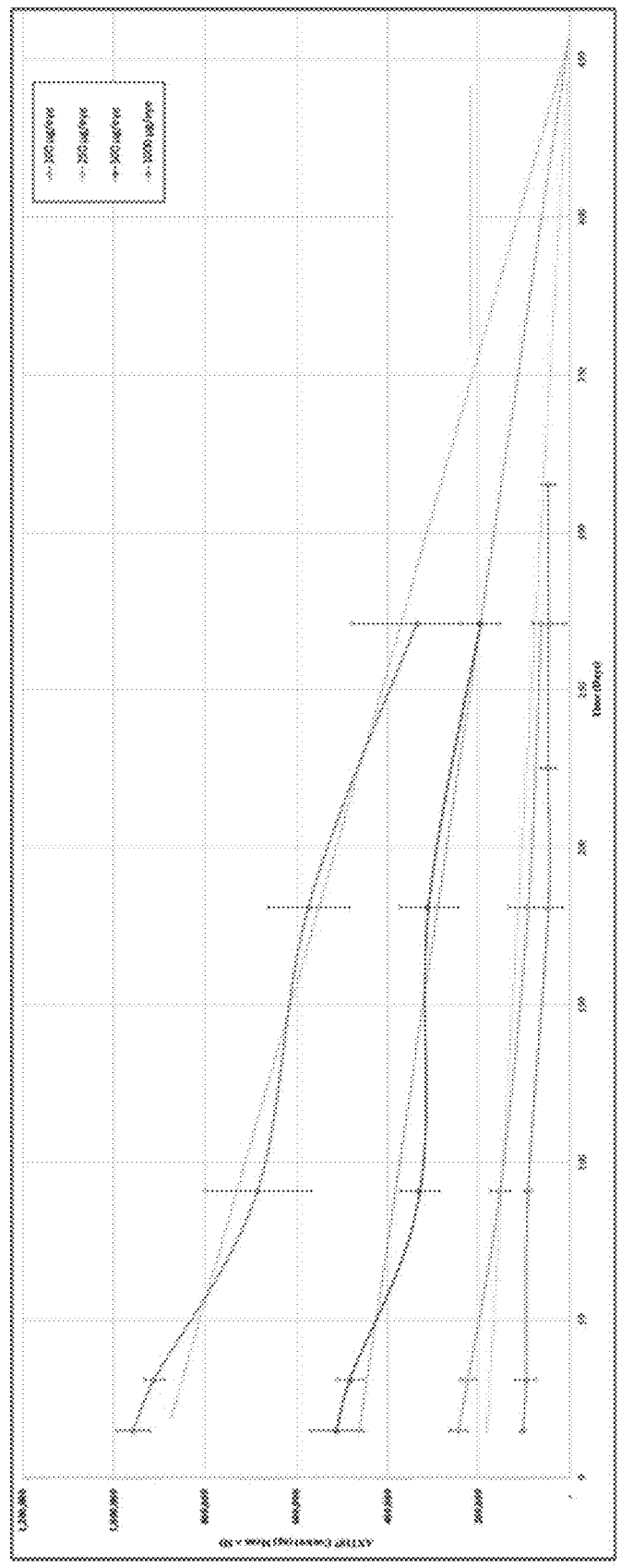
FIG. 5 is a graph showing the release of AXT107 from gels at 100 µg, 250 µg, 500 µg, and 1000 µg over time. Dashed lines show an estimate of the AXT107 levels through 361 days.

In FIG. 4, AXT107 formed a gel in the vitreous at the site of injection. The gel stayed in place and released the peptide in a sustained manner. FIG. 4 shows that the gel becomes smaller in place over time. At all time points, the back of the eye is clear, indicating that the peptide does not block the visual axis, and therefore, does not interfere with vision. The data of this experiment demonstrates that the peptide stays in place, and does not break apart or migrate for 15 months within the rabbit eye. FIG. 4 shows images of the gel over 301 days for AXT107 doses of 100 μg, 250 μg, 500 μg, and 1000 μg. FIG. 5 is a graph showing the release of AXT107 from gels over time. Dashed lines show an estimate of the AXT107 levels through 361 days.

Figure 6:
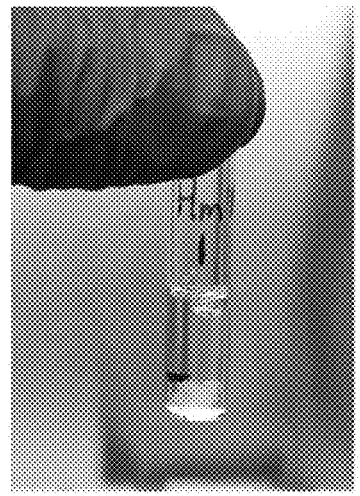
FIG. 6 is an image showing AXT107 gel formation in human vitreous of different ages.
Figure 6:

In the tube in FIG. 6, AXT107 was put into vitreous from a 5 yr old person and an 89 yr old person. These pictures show that the peptide forms a gel in human vitreous that is similar to the one seen in the rabbit vitreous.

Figure 7:
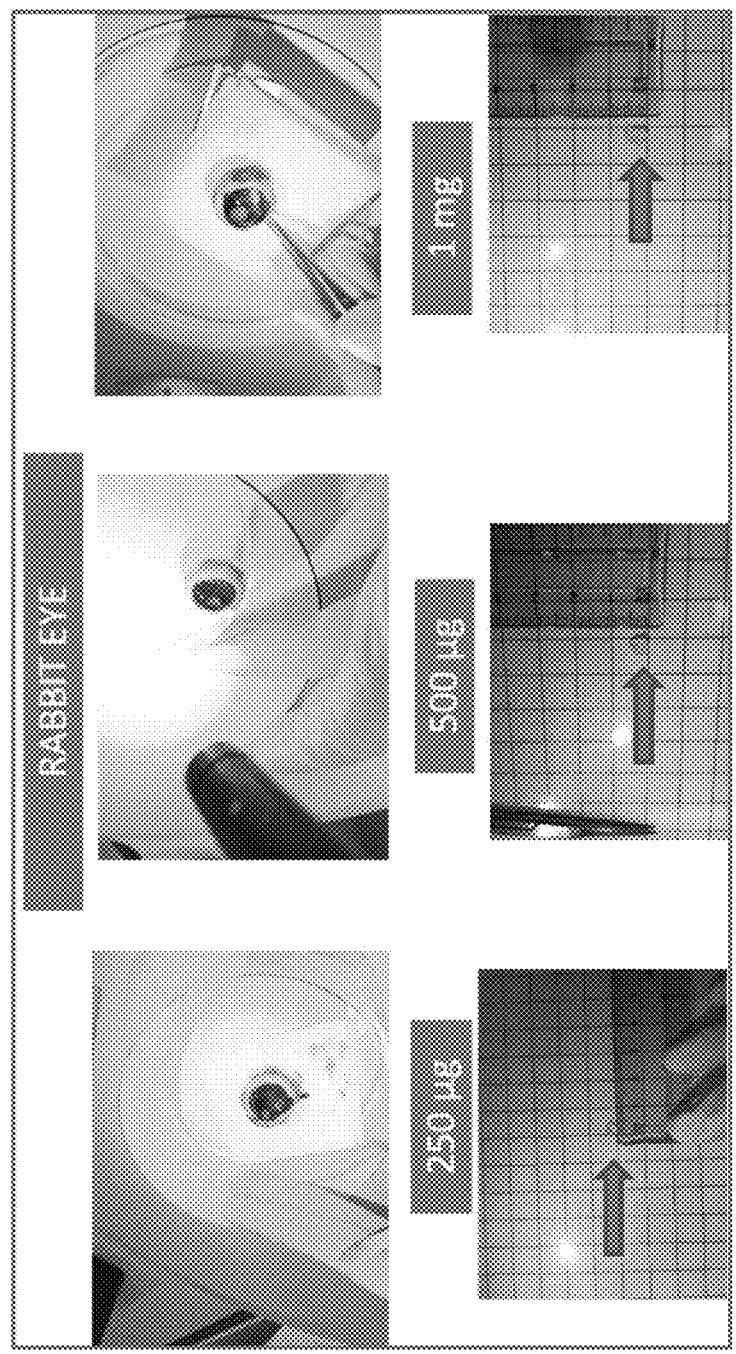
FIG. 7 are images showing gels formed by AXT107 in the rabbit eye from AXT107 PK toxicology study of different doses from Dutch-Belted necropsy rabbits at 6 Months after administration. Arrows point to isolated AXT107 gels.

In FIG. 7, AXT107 was injected into the vitreous of Dutch-Belted rabbits in a PK toxicology study. When the animals were necropsied and the eyes examined, the gels formed by the peptide were visible in the vitreous at all doses. The size of the gels correlated with the dose as seen on the bottom of FIG. 7 with the rulers (marked by arrows).

The invention claimed is:

1. A method for treating a condition involving ocular vascular permeability or inflammation in a patient, comprising: administering a unit dose of a collagen IV-derived biomimetic peptide or salt thereof to said patient by intraocular injection, wherein:
- the collagen IV-derived biomimetic peptide has the amino acid sequence LRRFSTAPFAFIDINDVINF (SEQ ID NO: 1); and
- the unit dose comprises about 150 µg to about 700 µg of the peptide or salt thereof and is administered at a frequency of no more than once every six months.

2. The method of claim 1, wherein the patient has a condition selected from diabetic macular edema, retinal vein occlusion, wet age-related macular degeneration (wet AMD), or background diabetic retinopathy.

3. The method of claim 1, comprising administering the unit dose at a frequency of once every six to eighteen months.

4. The method of claim 1, wherein the method comprises administering the peptide or salt thereof after unsuccessful VEGF blockade or inhibitor therapy.

5. The method of claim 1, wherein method comprises administering the peptide or salt thereof as an alternative to VEGF blockade or inhibitor therapy.

6. The method of claim 1, wherein the unit dose has a volume in the range of about 10 µL to about 50 µL.

* * * * *